United States Patent [19]

Schuermann

[11] Patent Number: 5,457,461
[45] Date of Patent: Oct. 10, 1995

[54] METHOD AND ARRANGEMENT FOR DETECTING ADJACENT TRANSPONDERS

[75] Inventor: Josef H. Schuermann, Oberhummel, Germany

[73] Assignee: Texas Instruments Deutschland GmbH, Germany

[21] Appl. No.: 105,538

[22] Filed: Aug. 11, 1993

[51] Int. Cl.$^6$ .................................................. G01S 13/74
[52] U.S. Cl. ............................. 342/42; 342/44; 342/50
[58] Field of Search .............................. 342/40, 42, 44, 342/50, 51

[56] References Cited

U.S. PATENT DOCUMENTS

| | | | |
|---|---|---|---|
| 3,872,476 | 3/1975 | Shames et al. | 342/40 |
| 4,761,651 | 8/1988 | Matsunaga | 342/40 |
| 5,053,774 | 10/1991 | Schuermann et al. | 342/44 |
| 5,126,744 | 6/1992 | Goedeke et al. | 342/40 |
| 5,150,114 | 9/1992 | Johansson | 340/825.54 |
| 5,294,931 | 3/1994 | Meier | 342/44 |

Primary Examiner—J. Woodrow Eldred
Attorney, Agent, or Firm—Brian C. McCormack; James C. Kesterson; Richard L. Donaldson

[57] ABSTRACT

A method for interrogating remote transponders having the steps of: sending an RF interrogation pulse from an interrogator (10), receiving by a first and second transponder (12,12a) the RF interrogation pulse, and establishing in a resonant circuit (130) of each of the transponders (12,12a) an oscillation, the oscillation being established by the coupling of signal energy from the RF interrogation pulse into the resonant circuit (130). After the RF interrogation pulse ends, the first transponder (12) senses the termination of the pulse and initiates a first RF response having a selected duration. A second RF response from the second transponder (12a) will also be detected in the first transponder (12) whose response will be affected by this second RF response. The differing response times in the first transponder (12) for responses affected and unaffected by neighboring transponders may be sensed in the interrogator so the interrogator may detect instances in which the RF responses which it received may have been conflicting.

16 Claims, 4 Drawing Sheets

METHOD AND ARRANGEMENT FOR DETECTING ADJACENT TRANSPONDERS

CROSS-REFERENCE TO RELATED PATENTS

The following coassigned patents are hereby incorporated herein by reference:

| Pat No.    | Filing Date | TI Case No. |
|------------|-------------|-------------|
| 5,053,774  | 2/13/91     | TI-12797A   |
| 07/981,635 | 11/25/92    | TI-16688    |

1. Field of the Invention

This invention generally relates to a method for detecting adjacent transponders.

2. Background of the Invention

There is a great need for devices or apparatuses which make it possible to identify or detect as regards their presence at a predetermined location objects which are provided with such devices or apparatuses in contactless manner and over a certain distance. An additional need exists to be able to determine if two or more transponders are adjacent to each other.

SUMMARY OF THE INVENTION

The preferred embodiment of the present invention detects the presence of adjacent transponders by measuring the duration of the response signal from the transponders. In the embodiments described in U.S. Pat. No. 5,053,774 and patent application Ser. No. 07/981,635, both assigned to Texas Instruments by Josef H. Schuermann, the normal period for response to an RF interrogation is approximately 20 ms during which the transponder is normally operable to provide a 128 bit response message. After this 20 ms time period, the output of the transponder is squelched. The squelching of the response signal is accomplished by a transponder timer, which is triggered by the end-of-burst (when the exciter signal has ceased). The timer counts up to 128 (bits) and then discharges the transponder charge capacitor.

The present invention is the first to utilize the coupling between adjacent transponders in order to determine whether two or more transponders are adjacent. When two transponders are adjacent, they both are charged up and respond individually to an RF interrogation. Thus, when one transponder sends a response signal, its field strength radiates into the other transponder. This radiated signal will interfere with the oscillation that is being maintained in the other transponder's resonant circuit. The interference from the cross-coupled responses will cause a beat in the resonant circuit of each of the transponders. This "beat" is analogous to the phenomenon heard by musicians when tuning two instruments that are out of tune. Because the instruments have different frequencies, a time-variant pattern of constructive interference (where the acoustic signals are in phase and increase the sound intensity) and destructive interference (where the acoustic signals are 180° degrees out of phase and decrease the sound intensity) can be heard. This time-variant pattern is referred to as a "beat."

This beat effect can occur in both transponders. Periods of destructive interference simulates for either transponder the end-of-burst effect, causing the timer to repeatedly reset (because any end-of-burst will reset the timer). Resetting the timer opens a new 128 msec window for the logic and transponder to transmit a data signal. Therefore the transponder's discharge function is repeatedly disabled by this beat effect and the transponder transmits until the charge capacitor is fully discharged.

A beat effect can also occur between the preferred embodiment transponder and other transponders, such as those made by manufacturers other than the assignee of the current invention. Interference from another type of transponder will still cause a beat in the resonant circuit and repeated resetting of the timer.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
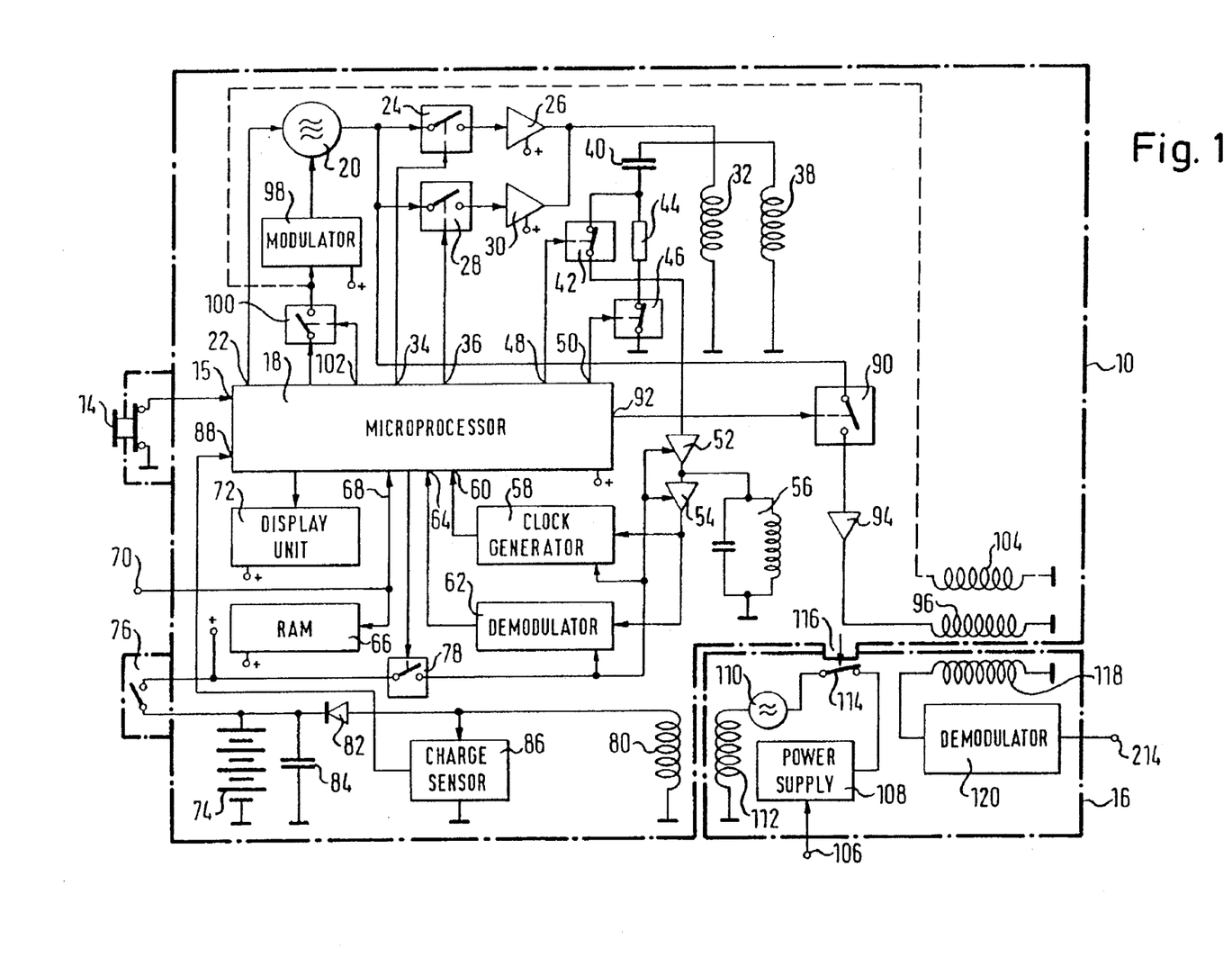
FIG. 1 is a block circuit diagram of a preferred interrogator and base unit.

In reference to FIG. 1, the transponder arrangement to be described includes an interrogator 10 and a transponder 12. The interrogator 10 is preferably constructed to be held in the hand of an operator and to transmit a RF interrogation pulse on actuation of a key 14. This interrogator 10 also has the capacity of receiving RF signals and detecting information contained in the signals. The RF signals come from the transponder 12 which according to this embodiment replies to the transmission of a RF interrogation pulse by sending back the RF signal having preferably the same frequency as the interrogation pulse. Preferably the RF signal is modulated with data by the transponder 12 using frequency shift keying (FSK) modulation. Associated with the interrogator 10 is a base unit 16 which is constructed as a stationary unit. The functions of the interrogator 10, the transponder 12 and base unit 16 and their interaction will be described in more detail hereinafter. Firstly, the makeup of these units will be explained.

The interrogator 10 contains as central control unit a microprocessor 18 which is responsible for the control of the function sequences. A RF oscillator 20 generates RF oscillations as soon as it has been set in operation by a signal at the output 22 of the microprocessor 18. The output signal of the RF oscillator 20 can be supplied either via a switch 24 and an amplifier 26 or via a switch 28 and an amplifier 30 to a coupling coil 32. The switches 24 and 28 are controlled by the microprocessor with the aid of signals emitted at its outputs 34 and 36 respectively. Coupled to the coupling coil 32 is a coil 38 of a resonant circuit which consists of the coil 38 and the capacitor 40. In series with the coil 38 and the capacitor 40 is a resistor 44 bridgeable by a switch 42 and a further switch 46 lies between the resistor 44 and ground. The switches 42 and 46 are controlled by the microprocessor which emits at its outputs 48 and 50 corresponding control signals. When the switch 46 is closed the resonant circuit comprising the coil 38 and capacitor 40 acts as parallel resonant circuit whilst when the switch 46 is open it acts as series resonant circuit. The coil 38 acts as transmitting and receiving coil which transmits the RF interrogation pulse supplied to it by the oscillator 20 and receives the RF signal sent back by the transponder 12.

The RF signals received by the resonant circuit are supplied to two amplifiers 52, 54 which are so designed that they amplify the RF signals received and limit them for pulse shaping. Connected to the amplifiers is a parallel resonant circuit 56 which ensures the necessary reception selectivity. The output of the amplifier 54 is connected to a clock generator 58 which from the signal supplied thereto generates a clock signal and supplies the latter to the input 60 of the microprocessor 18.

In addition, the output signal of the amplifier 54 is supplied to a demodulator 62 which demodulates the signal applied thereto and supplies it to the input 64 of the microprocessor 18.

The information contained in the received RF signal is supplied after the demodulation in the demodulator 62 via the microprocessor 18 to a random access memory 66 so that it can be stored in the latter. Between the microprocessor 18 and the random access memory 66, a bi-directional connection 68 is disposed which makes it possible to enter information from the microprocessor 18 into the random access memory 66 and also to transfer information in the opposite direction. The information stored in the random access memory 66 can be taken off at a jack 70.

A display unit 72 fed by the microprocessor 18 makes it possible for the operator to view the data contained in the RF signal received.

Since the interrogator 10 is a portable device, a rechargeable battery 74 is provided as a power supply. The output voltage of the battery 74 is supplied after closing a switch 76 to the terminals designated by "+" of selected chips in the interrogator 10. The supply voltage is however supplied to the two amplifiers 52, 54, the clock generator 58 and the demodulator 62 via a separate switch 78 which is controlled by the microprocessor 18. This makes it possible for those circuit elements to be supplied with voltage and thus active only during a predetermined period of time within the total operating cycle.

The battery 74 can be charged by a voltage induced in a coil 80, rectified in a rectifier 82 and smoothed by means of a capacitor 84. Preferably, the voltage is induced in coil 80 via a coil 112 in the base unit 16. A charge sensor 86 detects when a charge voltage is induced in the coil 80, i.e. a charging operation of the battery 74 is taking place. It then emits to the input 88 of the microprocessor 18 a corresponding message signal.

A further switch 90, controlled by means of a signal from the output 92 of the microprocessor 18, can in the closed state supply the output signals of the RF oscillator 20 via an amplifier 94 to a coupling coil 96. The switch 90 is typically used to activate the sending of a RF interrogation pulse to a transponder 12 to initiate a data transfer to or from the transponder 12.

With the aid of a modulator 98 the RF oscillator 20 can be modulated. The modulation signal necessary for this purpose is supplied to the modulator 98 by the microprocessor 18 via a switch 100 which is controlled by means of a signal from the output 102 of the microprocessor. The modulation signal from the microprocessor 18 is supplied when the switch 100 is closed also to a coupling coil 104.

The base unit 16 also illustrated in FIG. I is a stationary unit which is connected via a jack 106 to the mains supply network. In a power supply 108 the operating voltage for a charging voltage generator 110 is generated, the output signal of which is supplied to a coil 112. A switch 114 is inserted between the power supply 108 and the charge voltage generator 110. The switch 114 is closed whenever the interrogator 10 is placed on the base unit 16. This is shown in FIG. I symbolically by a sort of actuating button 116 at the boundary line of the interrogator 10. The coils 112 and 80 are arranged in the base unit and interrogator 10 spatially in such a manner that they cooperate like the primary winding and secondary winding of a transformer when the interrogator 10 is placed on the base unit 16. In this manner the battery 74 can be charged contactless as often as required. The coils 96 and 104 in the interrogator 10 are so arranged that they are spatially very close to a coil 118 when the interrogator 10 is placed on the base unit 16. In this manner a contactless signal transmission between the coil 96 and the coil 104 on the one hand and the coil 118 on the other is possible. A demodulator 120 serves to demodulate the signals coming from the coil 118.

Figure 2:
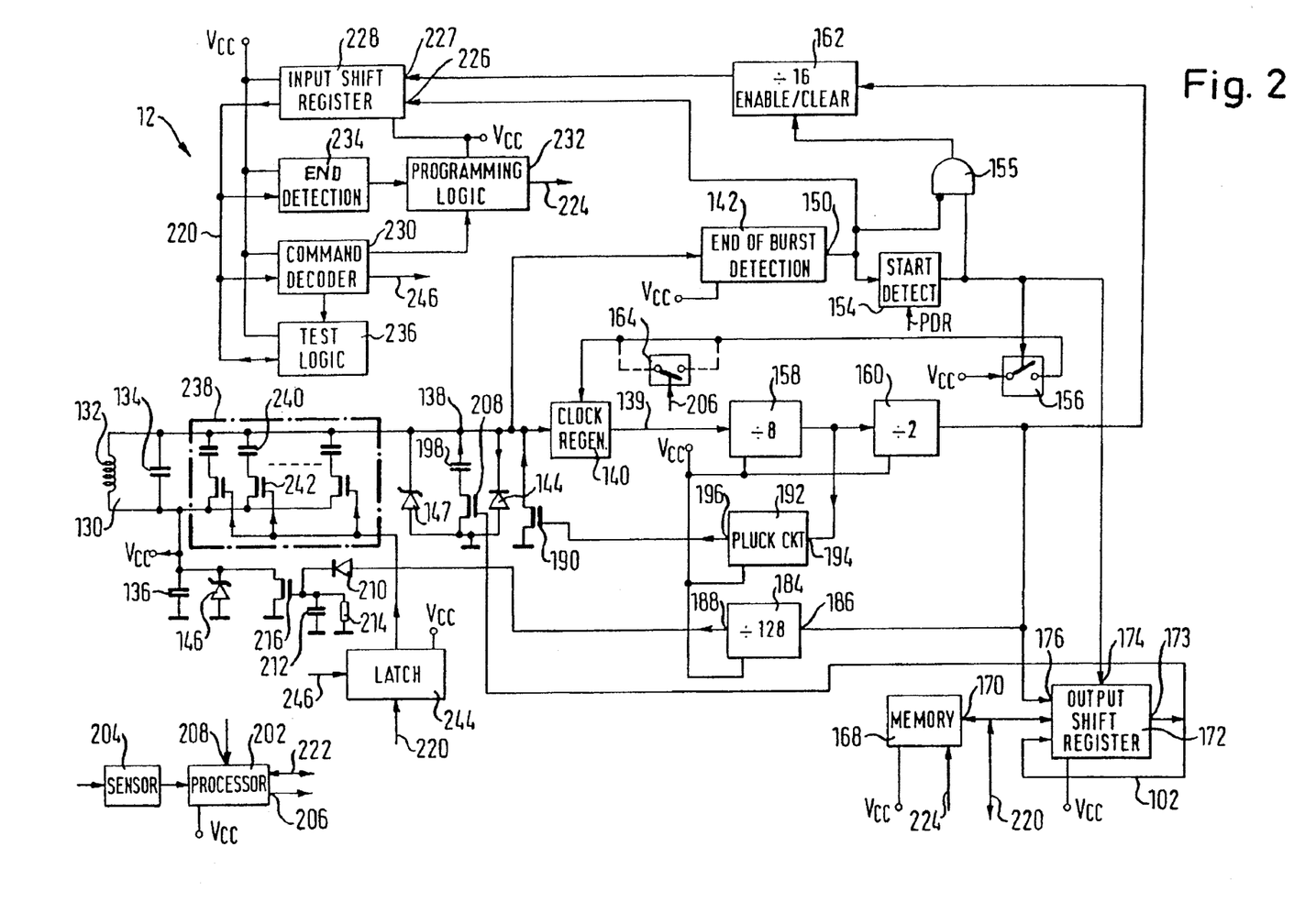
FIG. 2 is a block circuit diagram of a preferred transponder.

The preferred embodiment transponder 12 illustrated in FIG. 2 contains for reception of the RF interrogation pulse a parallel resonant circuit 130 having a coil 112 and a capacitor 134. Connected to the parallel resonant circuit 130 is a capacitor 136 serving as energy accumulator. In addition the parallel resonant circuit 130 is connected to a RF bus 138. The resonant circuit 130 acts as a receiver and as a transmitter as is well known in the art. A clock regenerator circuit receives the RF signal from the RF bus 138 and regenerates a clock signal 139 having a substantially square waveform. An end of burst detector 142 connected to the RF bus 138 has the function of monitoring the power level of a RF carrier at the RF bus 138. Such a RF carrier occurs at the RF bus 138 whenever the parallel resonant circuit 130 receives a RF interrogation pulse from the interrogator 10. The end of burst detector 142 emits at its output a RF threshold signal of predetermined value as soon as the power level of the RF carrier at the RF bus 138 drops below a predetermined threshold value. By connecting a diode 144 to the RF bus 138, the RF carrier is rectified and as a result the capacitor 136 is charged. The energy stored in capacitor 136 is proportional to the energy contained in the RF interrogation pulse. Thus, after reception of the RF interrogation pulse a DC voltage can be taken off at the capacitor 136. A zener diode function 146 connected to the capacitor 136 ensures that the DC voltage which can be tapped off does not exceed a value defined by the zener voltage of the diode 146 in practical implementations such as within an integrated circuit, the zener diode function 146 might be accomplished by a number of circuits well known in the art for limiting voltage. A zener diode function 146 serves a similar function to prevent the voltage on the RF bus 138 from becoming too great. Initially upon interrogation of the transponder 12 the interrogator 18 sends a RF signal to the transponder for the express purpose of charging the transponder 12. This is referred to as the charge phase.

A Power-On-Reset(POR, not shown) circuit provides a POR signal to a start detect circuit 154. This POR circuit monitors the Vcc level and is activated when the Vcc level rises from a level below a certain DC threshold to a level above a certain DC threshold. Typically, the POR signal occurs within the charge phase of the transponder. POR circuits are well known in the art, indeed they are commonly used in almost all of the class of circuits known as "state machines" so that the circuits may be initialized to a known state. The start detect circuit 154 upon receiving the POR signal will then monitor the output 150 of end of burst detection circuit 142. At output 150 is provided an end of burst signal (EOB). Upon receipt of an affirmatively stated EOB subsequent to the affirmatively stated Power-On-Reset signal, start detect circuit 1,54 switches power to the clock regenerator circuit 140 via switch 156. Clock regenerator circuit 140 preferably will clean up the signal from resonant circuit 130 and provide a regenerated RF clock which is preferably a square wave. Output of start detect circuit 154 will remain positively asserted until a subsequent POP, is received. All parts of the transponder other than the clock regenerator 140 are continuously supplied with Vcc, but preferably consume a negligible amount of power in their inactive states (i.e. when the clock regenerator 140 is inactive) due to the utilization of low power CMOS technology.

With further reference to FIG. 2, a divider 158 receives clock signal 139 and divides its frequency, preferably by a factor of eight. A pluck circuit 192 preferably sends a momentary pulse each time it is so triggered by the divided clock signal as received from divider 158. This pluck circuit 192 maintains the oscillation of resonant circuit 130 by momentarily rendering field-effect transistor or FET 190 conductive and forming therethrough a conductive path between the resonant circuit 130 and ground via RF bus 138 such that the resonant circuit gains electrical energy from storage capacitor 136. This pluck circuit 192 is figuratively named to describe the maintaining of the oscillation of resonant circuit 130 much like the plucking of a guitar string maintains the oscillation of the guitar string. While this "plucking" action will momentarily lower the voltage on RF bus 138 the duration of the pulse is not sufficient given the channel resistance of FET 190 to lower the voltage below the threshold to trigger the end of burst detection circuit 142 to activate. A second divider 160 divides the clock signal 139 again by a factor of two such that the clock frequency at the output of divider 160 is 1/16 the original clock frequency.

Still referring to FIG. 2, the read circuitry for the preferred embodiment will now be described. Connected to the output of second divider 160 is the shift clock input 176 of an output shift register 172 such that data is shifted through this register 172 at 1/16 the original clock frequency. Output shift register 172 receives a parallel load from memory 168 or another source via data bus 220 upon receipt at its shift/load_input 174 of a "load_" signal from the output of start detect circuit 154. Subsequent to loading of the output shift register 172 the signal from start detect circuit 154 is asserted positively and hence a "shift" signal is received at the shift/load$_{13}$ input 174 of register 172. While the "shift" signal is positively asserted data will be shifted through output shift register at 1/16 the original clock frequency due to the clock signal received at the shift clock input 176. As shown in the figure, the data recirculates through the output shift register 172 via the data path 182 and also feeds the gate of FET or modulator 200 via data path 182. The output shift register data are preferably low for a certain time (Pre-Bit-Time) and high or low dependent upon the data loaded therein. The Pre-Bit-Time is used in this embodiment to allow the interrogator receiver coil 38 time to recover from power burst overload (Charge Phase) and it is used to discriminate the read function from the write function as will be described below. While the output of output shift register 172 is low then the FET 200 is not conducting. While the output of output shift register 172 is high FET 200 conducts, thereby connecting capacitor 198 to the resonant circuit 130 and lowering the resonant frequency thereof. Essentially, the FET 200 acts as a switch under control of output shift register 172, connecting or leaving unconnected capacitor 198, which modulates the frequency of the resonant circuit 130. In this manner a frequency modulation of the resonant or carrier frequency of resonant circuit 130 is accomplished in response to the data applied to FET 200. A low or "zero" signal is represented when the original resonant frequency of the resonant circuit 130 is maintained throughout a bit period. A high or "one" signal is represented when the new resonant frequency of the parallel combination of original resonant circuit 130 in parallel with capacitor 198 occurs within a bit period.

With still further reference to FIG. 2, the operation of a discharge logic circuit will now be described. A timer 184 receives at its input 186 the output of divider 160 and divides the clock signal by yet another factor of 128. The division factor of timer 184 is 128 in this instance due to the preferred data transmission bit length of 128. If this bit length were to change, then the division factor of timer 184 would preferably change correspondingly. A diode 210 maintains unidirectional current flow from the timer 184 into a parallel RC combination of a capacitor 212 and a resistor 214 which maintain charge on the gate of a field-effect transistor or FET 216 for a known duration. With the diode 210 the capacitor 212 may be charged by timer 184 but must be discharged through resistor 214. The FET 216 serves to provide, when the gate of FET 216 maintained above a threshold voltage by the parallel combination of resistor 214 and capacitor 216, a low impedance discharge path for storage capacitor 136 to ground. In this manner, after transmission of a complete data frame in this case of 128 bits (read phase) from the transponder 12 to the interrogator 10, the remaining energy in the transponder 12 is eliminated by a short circuit across the charge capacitor 136. This action secures that the transponder is correctly initiated during the next charge phase and does not rest in a undefined or incorrect state such that a subsequent charge-up could be blocked. Additionally by this function, each transponder 12 within the field of the interrogator 10 has an identical start condition.

Figure 4:
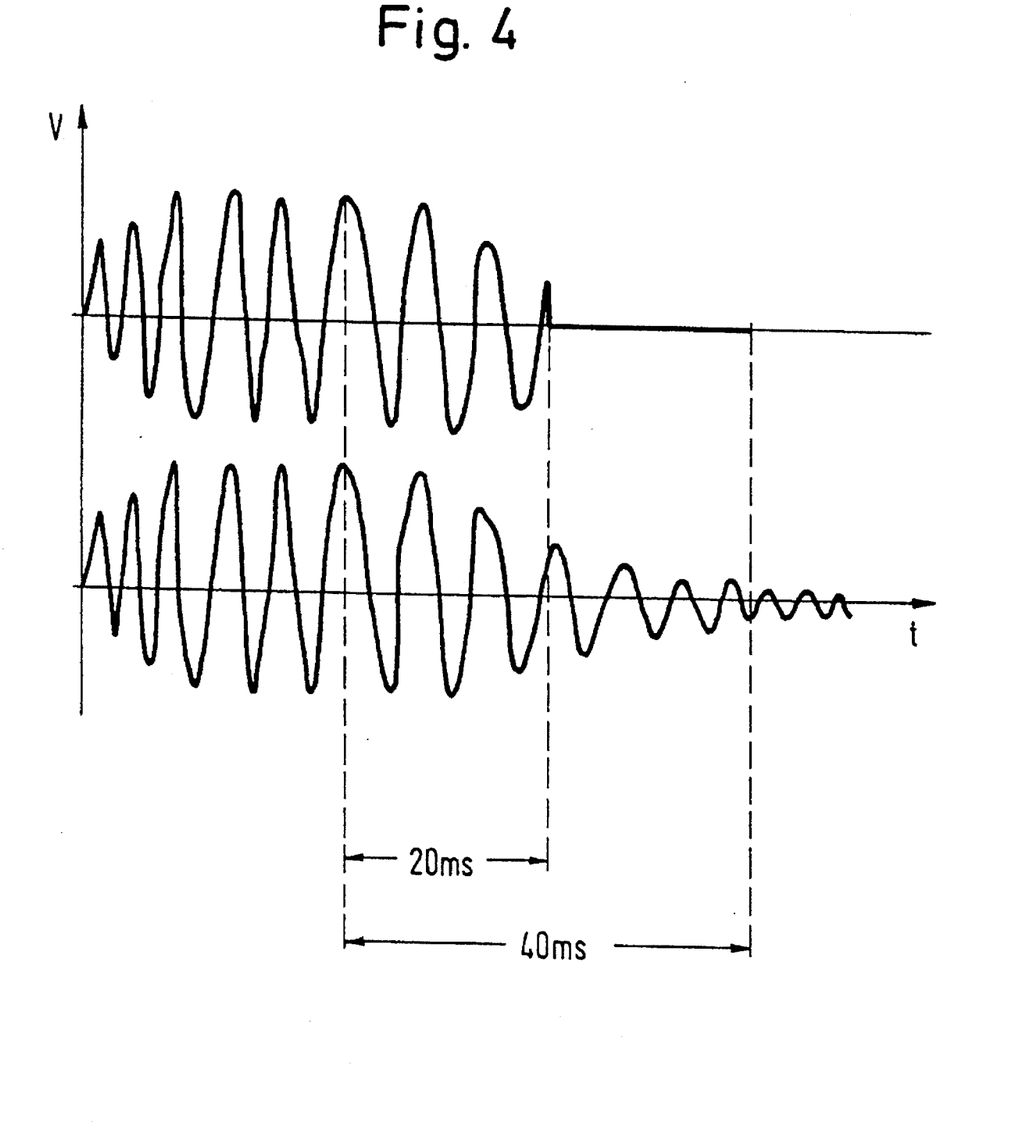
FIG. 4 shows signal waveform graphs for antenna signals for a normal transponder response with no interfering adjacent transponders and for a transponder response with another transponder located in close proximity.

Still referring to the circuitry of transponder 12 as shown in FIG. 2, the circuitry with which data may be written into transponder 12 (the write function) will now be described. In a preferred embodiment of the invention the interrogator 10 may pulse pause modulate (PPM) the RF interrogation pulse as shown in FIG. 4. This signal is reflected on RF bus 138. As is well known in the art, a pulse pause modulation system operates by alternatively activating and deactivating a carrier wave. During the time period in which the carder is deactivated, the end of burst detector 142 senses a decrease in RF energy and is activated. After the start detect circuit 154 is enabled by the POR signal, the start detect circuit 1,54 is then activated by the first EOB signal caused by the Start Bit (see FIG. 4). Although a Start Bit is used in this preferred embodiment due to the fact that each data bit status is transmitted by the presence or absence of a carrier wave off phase as will be further described. Other embodiments are possible, however, in which no Start Bit needs to be transmitted. The duration of the time period in which the carrier is deactivated, known as the "off" phase, is shorter than the Pre-Bit-Time of the read phase. This particular requirement is used within this embodiment due to the fact that during the off phase, the output shift register 172 will start to shift. But since the Pre-Bit-Time is greater than the off phase the output shift register is unsuccessful in shifting anything but zeros out, so in fact FET 198 is never activated and inverted and no unwanted modulation of the carrier 138 will occur. The EOB signal is then deactivated when the carrier returns. The activations and deactivations of the EOB signal serve to provide a data stream to the data input 226 input of input shift register 228. Regardless of the transitions of EOB start detect circuit 154 maintains its output active until a new POR signal is received, thus maintaining power to clock regenerator circuit 140 via switch 156.

A fourth divider 162 is provided receive the clock signal from second divider 160 and the divide clock signal again by 16 in order to supply the clock input 227 of the input shift register 228 with an Input Clock signal. In the preferred embodiment, then, the write data rate is ½56 of the resonant frequency or receive clock frequency. Provision must be made that the data is shifted into the input shift register 228 while the data is stable. This can be assured in the following manner. The fourth divider 162 is activated by the start detect circuit 154 via AND gate 155. Each consecutive "zero" bit or "low" bit received by end of burst detection circuit 142 positively asserts the output 150 of the burst detection circuit. The positively asserted signal is then received the negative logic input of AND gate 155. The negative logic input is indicated by a "bubble" at the input of AND gate 155 as is well known in the art. By definition of the AND function the output of AND gate 155 will then be negatively asserted, thereby clearing the fourth divider 162 and synchronizing the Input Clock to the Input Data.

End detection circuit 234 detects the end of a data frame if a certain bit combination is in the input shift register 228 and thereupon activates the programming logic 232 if a programming command has been previously received by command decoder 230. The data is then transferred from input shift register 228 to memory 168 or another memory via parallel data bus 220. Preferably, the memory to which the data is transferred is an electrically-erasable programmable read only memory (EEPROM).

End of burst detector 142 is generally acting in the capacity of a pulse pause modulation (PPM) demodulator. Many other modulations schemes are known in the art for radio communication and instead of the end of burst detector, another demodulator might be used for another of such schemes.

Provision is also made in this preferred embodiment to initiate a test sequence via test logic 236. Test logic 236 receives signals from command decoder 230 and data from data bus 220 and may initiate numerous test routines such as are commonly implemented in the field of logic circuit design. The results of these test routines may be placed on data bus 220 and output by shift register 172 to the modulation circuitry via field-effect transistor 200.

A programmable tuning network 238 is provided in the preferred embodiment of the present invention. This programmable tuning network 238 operates by switching a network of parallel capacitors 240, each capacitor 240 being connected through a field-effect transistor or FET 242 to ground. Each field-effect transistor is connected to a latch 244 which receives and latches data from the memory 168 or from command decoder 230 via data bus 220 under control of a latch signal 246 from the command decoder 230. By switching a field-effect transistor 242 to a conducting "ON" state, it,s associated capacitor 240 is connected in parallel with parallel resonant circuit 130. This added capacitance will lower the resonant frequency of the parallel resonant circuit 130. By switching a field-effect transistor 242 to a non-conducting "OFF" state, its associated capacitor 240 is floating and has no effect on the parallel resonant circuit 130. A network 238 of FET/capacitor pairs 240,242 can provide many different values of added capacitances depending on the combinations of each capacitor's 240 relative value as is well known in the art. Alternatively, latch 244 could be a one-time-programmable (OTP) memory such that the data is fixedly stored therein and the device may be permanently programmed to set the value of programmable tuning network 238.

The factors of the dividers disclosed in the embodiments listed herein are chosen to fit the particulars of each design. The division factors should be selected in each case to most optimally perform the task for which hey were designed.

Figure 3:
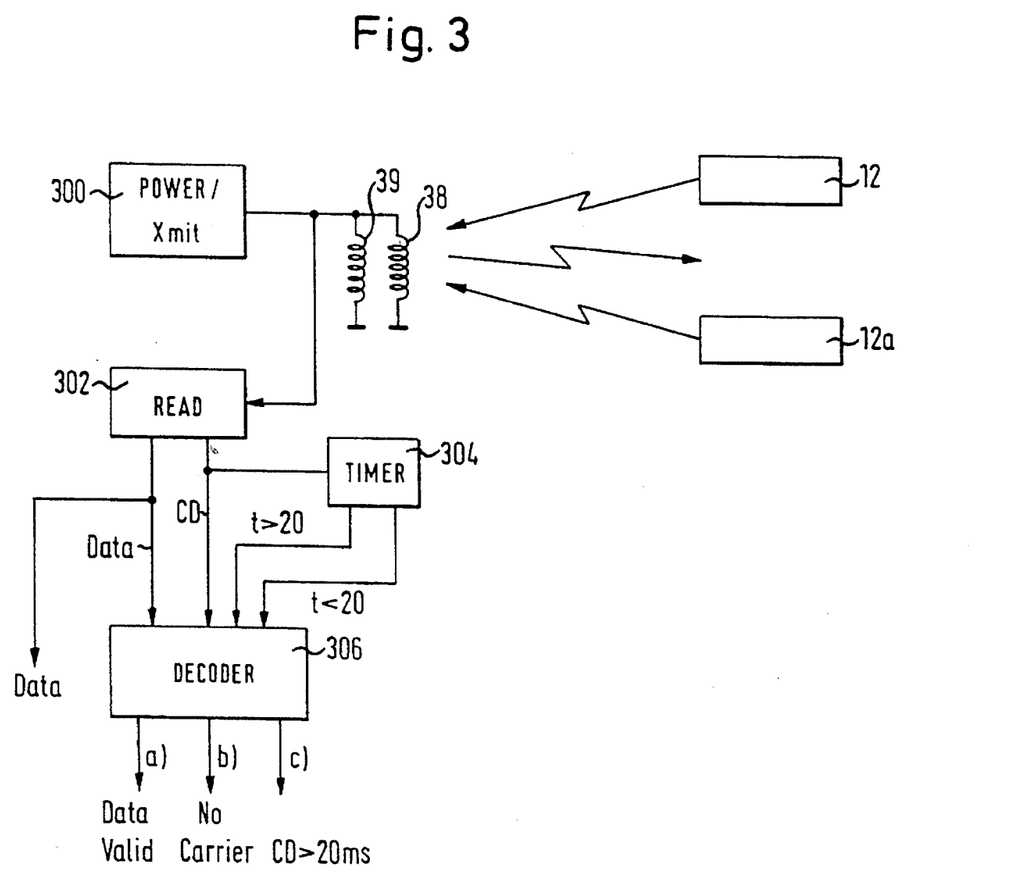
FIG. 3 is a more general block diagram of the preferred arrangement showing its most salient features.

With reference to FIG. 3 in conjunction with FIGS. 1–2, it will be assumed that within the range of the coil 38 transmitting the RF interrogation pulse at least two transponders 12, 12a are present. Power/Xmit circuitry 300 is provided to drive the coil 38. As an alternative configuration, a separate antenna 39 might be provided as the "send" antenna, while the coil 38 could be used as the "receive" antenna 38. Preferably, however, coil 38 would act as both "send" and "receive" antenna. Power/xmit circuitry 300 might preferably comprise the oscillator 20 and the amplifier 26 of the preferred embodiment interrogator 10 of FIG. 1. The coil 132 of the parallel resonant circuit 130 (FIG. 2) of the transponder 12, 12a then receives this RF interrogation pulse so that the resonant circuit 130 is stimulated to oscillate. By means of the rectifier diode 144 the RF oscillation at the portion 138a of the RF bus 138 is rectified and the capacitor 136 is charged with direct current. For the energy supply of transponders 12, 12a thereafter, only the energy stored in the capacitor 136 is used. A "read" circuit 302 is then provided to receive the transponder response. The "read" circuit 302 preferably comprises the clock generator 58 which could also provide a carrier detect (CD) signal to the microprocessor, or the microprocessor 18 might interpret the absence or presence of a clock signal to be the carrier detect. A timer 304 would preferably be provided within the microprocessor 18 of the interrogator 10. The timer 304 would then measure the duration of the presence of a clock signal. Given the data signal from the "read" circuit 302 and the timer 304 output, it would be possible for the decoder 306 to determine if: a) a good read occurred in which the data was valid and CD<=20 ms; b) no read occurred such that CD was not detected; and c) CD>=20 ms, therefore more than two transponders are present in proximity to the interrogator. The functions of decoder 306 preferably reside within microprocessor 18 of the preferred interrogator 10.

With reference now to FIG. 4, with the termination of the reception of the RF interrogation pulse, the RF level at the RF bus 138 begins to drop. The end-of-burst detector 142 detects this decrease and at its output 150 emits a EOB signal of predetermined value as soon as the power level drops below a predetermined level. The timer 184 is reset by EOB.

After termination of the excitation pulse at the output of the pluck circuit 192 the field-effect transistor 190 is rendered nonconductive so that no more current can flow through the coil 132. Since however the parallel resonant circuit 130 has a high quality, the RF carrier oscillation does not cease immediately but the resonant circuit continues to oscillate with a damped oscillation. The divider 158, dividing the frequency of the RF carrier wave by two, emits after the second oscillation period a signal to the monoflop 192 which is thereby triggered. The monoflop 192, for the duration of its hold time, applies a maintenance pulse to the field-effect transistor 190. By the maintenance pulse from the pluck circuit 192, for the duration of the hold time, a current flow is caused through the coil 132 and this means that for a short time energy is "pumped" into the RF carrier wave generator. This pumping effect occurs after every nth oscillation period of the RF carrier wave, due to the use of the divider 158.

It will be assumed that data are fixedly stored in the memory 168 and the data are uniquely assigned to the transponders 12, 12a. The data may for example consist of 128 bits. With the timing of the clock signals applied to the clock input 176 the information present in the memory 168 is transferred to the output shift register 172. For this transfer operation, 128 pulses are required because then all the 128 data bits of the information are contained in the shift register 172. By also counting the clock pulses, the timer 184 determines when the transfer of the data is completed. After receiving 128 pulses, the timer 184 emits at its output 188 a signal to the FET 216 through diode 210. The division factor of timer 184 is 128 in this instance due to the preferred data transmission bit length of 128. If this bit length were to change, then the division factor of third timer 184 would preferably change correspondingly. A diode 210 maintains unidirectional current flow from the timer 184 into a parallel RC combination of a capacitor 212 and a resistor 214 which maintain charge on the gate of a field-effect transistor or FET 216 for a known duration. With the diode 210 the capacitor 212 may be charged by timer 184, but must be discharged through resistor 214. The FET 216 serves to provide, when the gate of FET 216 maintained above a threshold voltage by the parallel combination of resistor 214 and capacitor 216, a low impedance discharge path for storage capacitor 136 to ground. In this manner, after transmission of a complete data frame in this case of 128 bits (read phase) from the transponder 12 to the interrogator 10, the remaining energy in the transponder 12 is normally eliminated by a short circuit across the charge capacitor 136. This action secures that the transponder is correctly initiated during the next charge phase and does not rest in a undefined or incorrect state such that a subsequent charge-up could be blocked.

In the instance when two or more transponders 12, 12a lie adjacently, it is desirable for the interrogator 10 to detect such a condition to avoid considering the interfering signals from the transponder 12, 12a as valid data. By making use of the consequence of cross-coupling between adjacent transponders 12, 12a the interrogator 10 can sense the presence of adjacent transponders 12, 12a. If such a condition is detected, the interrogator 10 can then take such action as a more rigorous or selective addressing of the transponders 12, 12a or notification of the user. For the case with the two adjacent transponders 12, 12a, both are charged up and respond individually so as one transponder 12 answers, its field strength radiates into the other transponder 12a because of the close coupling between them. This close coupling will cause a "beat" in each of the transponder's resonant circuits 130 because their frequencies differ slightly. This "beat" during periods of destructive interference (e.g. the signal in the resonant circuit 130 of one transponder 12 perhaps 180° degrees out of phase with the coupled signal from the other transponder 12a) will cause the end-of-burst detector 142 to reset the timer 184. Resetting the timer 184 opens a new 128 bit window for the response. This will continuously happen in each transponder 12, 12a. Thus, instead of the signal oscillation energy in the resonant circuit 130 being damped after 20 ms, the natural oscillation is allowed to die out with the normal parasitic damping effects. In practical examples, this new time period is approximately 40 ms.

It can be further determined if there is another type of transponder, that is to say, not the type of transponder described herein as the preferred embodiment, adjacent to the preferred transponder 12. In such a case, because the other transponders have more losses (e.g. operate with lower Q-factors and consume more energy during the function from the preferred transponder 12), the transponder 12 delivers more energy from its own oscillation to the adjacent transponder and is faster discharged. Thus, in a practical example, the transponder may now discharge in about 30 ms instead of 40 ms. In either case, the discharge period is greater than the 20 ms, had the oscillation been damped as for a normal interrogation cycle.

A few preferred embodiments have been described in detail hereinabove. It is to be understood that the scope of the invention also comprehends embodiments different from those described, yet within the scope of the claims.

For example, "microcomputer" is used in some contexts to mean that microcomputer requires a memory and "microprocessor" does not. The usage herein is that these terms can also be synonymous and refer to equivalent things. The phrase "processing circuitry" or "control circuitry" comprehends ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include SRAM (static random access memory), DRAM (dynamic random access memory), pseudo-static RAM, latches, EEPROM (electrically-erasable programmable read-only memory), EPROM (erasable programmable read-only memory), registers, or any other memory device known in the art. Words of inclusion are to be interpreted as nonexhaustive in considering the scope of the invention.

Implementation is contemplated in full-duplex transponder arrangements or half-duplex transponder arrangements. Frequency shift keying (FSK) modulation is envisioned as a possible data modulation scheme, as well as pulse-pause modulation, amplitude shift keying (ASK), quadrature AM (QAM) modulation, quadrature phase shift keying (QPSK), or any other modulation. Different types of multiplexing such as time or frequency modulation might be effected to avoid cross-signal interference. Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for interrogating remote transponders, said method comprising the steps of:

a) sending an RF interrogation pulse from an interrogator;

b) receiving by a first and second transponder said RF interrogation pulse;

c) terminating said RF interrogation pulse;

d) sensing in said first transponder termination of said RF interrogation pulse;

e) initiating in said first transponder an RF response having a selected duration;

f) sensing in said first transponder RF signals from said second transponder; and g) modifying the duration of said RF response in said first transponder upon detection of said RF signals from said second transponder.

2. The method of claim 1 and further comprising the step of receiving said RF response by said interrogator and analyzing the duration thereof to determine if both of said first and second transponders are within proximity of said interrogator.

3. The method of claim 2 and further comprising the step of selectively addressing by said interrogator one of said first and second transponders.

4. The method of claim 1 wherein said first transponder is a half-duplex transponder.

5. The method of claim 4 wherein said second transponder is a half-duplex transponder.

6. The method of claim 4 wherein said second transponder is a full-duplex transponder.

7. The method of claim 1 wherein said first transponder has a resonant circuit for receiving said RF interrogation pulse and for establishing an oscillation in said resonant circuit in response to said RF interrogation.

8. The method of claim 7 wherein said sensing in said first transponder of said RF signals from said second transponder is accomplished by sensing destructive interference between said oscillation established in the resonant circuit of said first transponder and RF signals from said second transponder.

9. The method of claim 1 wherein said duration is selected by a counter that counts up to a pre-selected number of oscillations in said resonator.

10. A method for interrogating remote transponders, said method comprising the steps of:

a) sending an RF interrogation pulse from an interrogator;

b) providing a first and a second transponder in proximity to said interrogator, each of said first and second transponder having a resonant circuit comprising the parallel combination of a coil and a capacitor;

c) receiving by the coil of each of said transponders said RF interrogation pulse;

d) establishing in said resonant circuit of each of said transponders an oscillation, said oscillation being established by the coupling of signal energy from said RF interrogation pulse into said resonant circuit;

e) terminating said RF interrogation pulse from said interrogator;

f) sensing in said first transponder termination of said RF interrogation pulse;

g) initiating in said first transponder an RF response having a selected duration;

h) sensing destructive interference between said oscillation established in the resonant circuit of said first transponder and RF signals from said second transponder;

i) modifying the duration of said RF response in said first transponder; and j) receiving said RF response by said interrogator and analyzing the duration thereof to determine said first and second transponders are within proximity of said interrogator.

11. An arrangement for interrogating remote transponders, said arrangement comprising:

a) an interrogator, said interrogator operable to send an RF interrogation pulse and to receive an RF response;

b) a first and a second transponder in proximity to said interrogator, at least said first transponder having a resonant circuit, said resonant circuit operable to receive said RF interrogations from said interrogator and to establish an oscillation therein from the signal energy within said RF interrogation pulse;

c) a transponder end-of-burst detector in electrical communication with said resonant circuit for detecting the end of the RF interrogation pulse;

d) a transponder transmitter in electrical communication with said end-of-burst detector for transmitting an RF response to said RF interrogator;

e) a transponder counter for determining when the response message from said transponder is complete and for disabling said transmitter; and f) a response signal detector in said transponder for detecting responses from adjacent transponders and resetting said transponder counter.

12. The arrangement of claim 11 wherein said transponder end-of-burst detector and said transponder transmitter have intervening control circuitry for control thereof.

13. The arrangement of claim 11 wherein said interrogator has an antenna for receiving said RF responses.

14. The arrangement of claim 13 wherein said interrogator further comprises a "read" circuit in electrical communication with said antenna for detecting valid data returned from said transponders.

15. The arrangement of claim 14 wherein said interrogator further comprises a timer circuit in electrical communication with said antenna for measuring the duration of said RF response from said first transponder.

16. The arrangement of claim 15 wherein said interrogator further comprises a decoder in electrical communication with said "read" circuitry and with said timer circuit.

* * * * *